(No Model.)
W. DRISCOLL.
MOLD FOR FORMING CRUCIBLES AND OTHER ARTICLES OF PLASTIC MATERIAL.
No. 248,722. Patented Oct. 25, 1881.
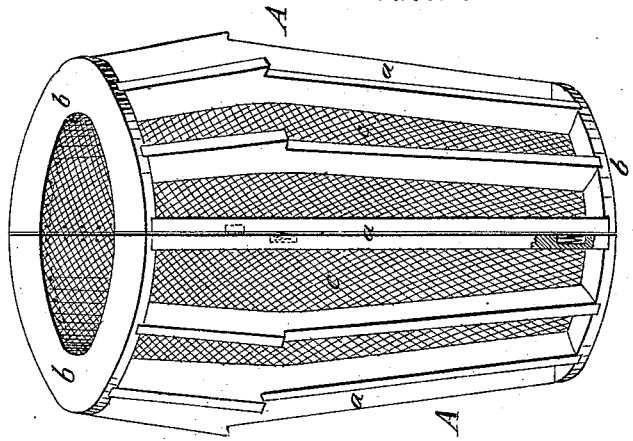
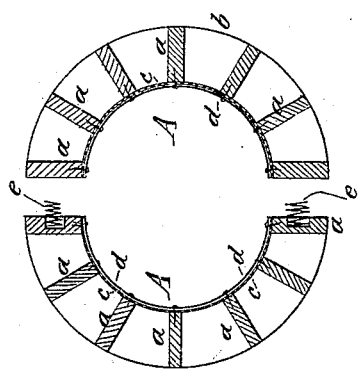
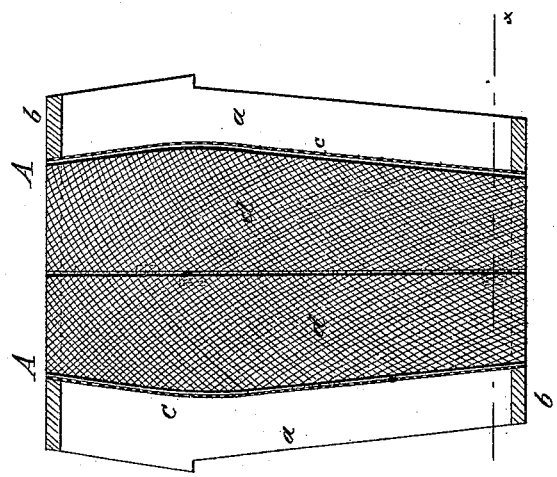
WITNESSES:
INVENTOR:
W. Driscoll
BY
ATTORNEYS.

UNITED STATES PATENT OFFICE.

WILLIAM DRISCOLL, OF TAUNTON, MASSACHUSETTS, ASSIGNOR TO HIMSELF AND H. D. ATWOOD, OF SAME PLACE.

MOLD FOR FORMING CRUCIBLES AND OTHER ARTICLES OF PLASTIC MATERIAL.

SPECIFICATION forming part of Letters Patent No. 248,722, dated October 25, 1881.

Application filed June 2, 1881. (No model.)

*To all whom it may concern:*

Be it known that I, WILLIAM DRISCOLL, of Taunton, Bristol county, Massachusetts, have invented a new and useful Improvement in Molds for Forming Crucibles and other Articles of Plastic Materials, of which the following is a specification.

My invention relates to molds for forming crucibles and articles of pottery-ware; and it consists in a skeleton-frame mold provided with a lining or backing of flexible and porous material, whereby the water pressed from the material or composition in the mold is allowed to escape freely.

In the accompanying drawings, Figure 1 is a longitudinal section of a crucible-mold constructed in accordance with my invention. Fig. 2 is a horizontal section, and Fig. 3 a perspective elevation, of the same.

Similar letters of reference indicate corresponding parts.

The mold is made, as usual, in two portions, A A, the line of division being longitudinal. The frame consists of longitudinal ribs $a\ a$, of which there are six or more to each portion A, and end pieces or ring-segments $b$. The ribs $a$ are preferably made of well-seasoned wood, and are cut out to the proper shape and length, and secured to segments $b$ by mortising and screws, or in any suitable manner, whereby they shall be securely held.

On the inside of the frame is secured the backing $c$. This is made of heavy cloth or other material of flexible and porous character, and is secured by tacking to the ribs, after which it is shaped by blocking. Next to the backing $c$ is a lining, $d$, of similar material, except that it is finer. This lining forms the wall of the mold, and can be secured in any suitable manner. With this backing and lining the water pressed from the composition can escape freely, and the lining will thus be retained in a comparatively dry condition. With a solid backing the lining soon becomes saturated, and must be put aside for washing and drying. The porous backing obviates that difficulty.

The ribs $a$ at the division of the two parts of the mold are recessed and fitted with spiral springs $e\ e$. These springs project, so that when the parts are placed together they shall be compressed, and thus tend to separate the mold.

Elliptic or other springs may be used for the same purpose. I do not limit myself in that respect.

In using the mold the two parts will be clamped together by a hoop in the usual manner. As soon as the hoop is removed the springs $e$ will separate the molds a short distance, so that their entire removal is thereby facilitated.

Having thus described my invention, I claim as new and desire to secure by Letters Patent—

1. A mold for plastic materials having walls or backing formed of porous material, substantially as shown and described.

2. In molds, a backing of cloth or similar flexible porous material combined with a skeleton-frame, substantially as shown and described.

3. In molds, the backing $c$ and lining $d$, of flexible porous material, the longitudinal ribs $a$, and segments $b$, combined substantially as shown and described.

4. The combination, with a two-part mold, of springs $e$, substantially as and for the purpose set forth.

WILLIAM DRISCOLL.

Witnesses:
T. C. MARLEY,
CHARLES H. PAULL.